(12) United States Patent
Sitter, Jr.

(10) Patent No.: US 10,330,929 B2
(45) Date of Patent: Jun. 25, 2019

(54) CROSS-BAND APOCHROMATIC CORRECTION AND APPLICATIONS IN THE LWIR AND SWIR BANDS

(71) Applicant: RAYTHEON COMPANY, Waltham, MA (US)

(72) Inventor: David N. Sitter, Jr., Torrance, CA (US)

(73) Assignee: RAYTHEON COMPANY, Waltham, MA (US)

(*) Notice: Subject to any disclaimer, the term of this patent is extended or adjusted under 35 U.S.C. 154(b) by 323 days.

(21) Appl. No.: 15/219,648

(22) Filed: Jul. 26, 2016

(65) Prior Publication Data

US 2018/0031828 A1   Feb. 1, 2018

(51) Int. Cl.
   *G02B 27/00*   (2006.01)
   *G02B 13/14*   (2006.01)

(52) U.S. Cl.
   CPC ......... *G02B 27/0062* (2013.01); *G02B 13/14* (2013.01); *G02B 13/146* (2013.01); *G02B 27/005* (2013.01); *G02B 27/0012* (2013.01)

(58) Field of Classification Search
   CPC .............. G02B 27/0062; G02B 13/146; G02B 27/0012; G02B 27/00; G02B 13/14
   (Continued)

(56) References Cited

U.S. PATENT DOCUMENTS 4,776,868 A * 10/1988 Trotter, Jr. .............. B29C 41/02
                                                264/1.1
7,218,444 B2   5/2007 Cook
(Continued)

FOREIGN PATENT DOCUMENTS

EP   0940702 A2   9/1999
EP   3015902 A1   5/2016

OTHER PUBLICATIONS

International Search Report and Written Opinion for application No. PCT/US2017/022458 dated Jun. 14, 2017.
(Continued)

*Primary Examiner* — Stephone B Allen
*Assistant Examiner* — Rahman Abdur
(74) *Attorney, Agent, or Firm* — Lando & Anastasi, LLP

(57) ABSTRACT

A method for cross-band apochromatic correction in a multi-element optical system. In one example, the method includes selecting a set of design wavelengths, determining a set of optical materials that are transmissive at each design wavelength, identifying a system of linear equations that describe the multi-element optical system in terms of a normalized optical power over the set of design wavelengths, generating multiple solutions for the system of linear equations, each solution defining a set of design optical materials selected from the set of optical materials and based at least in part on calculating mean squared difference values for wavelength pair combinations of design wavelengths in the set of design wavelengths, determining a merit value for each solution using a merit function, the merit value based on minimizing the mean squared difference values, ranking the merit values of the multiple solutions, and using at least one solution of the multiple solutions to design the multi-element optical system. In some examples, at least one design wavelength is a SWIR wavelength and at least one design wavelength is a LWIR wavelength.

20 Claims, 17 Drawing Sheets

(58) Field of Classification Search
USPC .......................................................... 359/356
See application file for complete search history.

(56) References Cited

U.S. PATENT DOCUMENTS

| | | | | |
|---|---|---|---|---|
| 2002/0183994 | A1* | 12/2002 | Fuse | G02B 5/1847 |
| | | | | 703/6 |
| 2003/0086055 | A1* | 5/2003 | Morris | G02C 7/02 |
| | | | | 351/159.01 |
| 2013/0278999 | A1* | 10/2013 | Carlie | C03C 3/32 |
| | | | | 359/356 |
| 2014/0268315 | A1* | 9/2014 | Carlie | G02B 13/14 |
| | | | | 359/356 |
| 2016/0114543 | A1* | 4/2016 | Kaijima | G02B 27/0012 |
| | | | | 700/98 |
| 2016/0116719 | A1* | 4/2016 | Thompson | G02B 27/0062 |
| | | | | 359/356 |

OTHER PUBLICATIONS

Irving, B.R., "Code V Test Drive", Optical Research Associates, version 7.20, pp. 1-29, May 1, 1989.

Eric Herman et al. "System design process for refractive simultaneous short and long wave imaging," Applied Optics, vol. 52, No. 12, 2761-2772 (2013).

Scott Sparrold et al. "Refractive Lens Design for Simultaneous SWIR and LWIR Imaging," Proc. of SPIE, vol. 8012, 801224 (2011).

C. Gruescu et al. "Optical Glass Compatibility for the Design of Apochromatic Systems," Science of Sintering (2008).

* cited by examiner

Lens Powers: $\Phi_1, \Phi_2, \Phi_3$
Abbe Numbers: $V_1, V_2, V_3$
Partial Dispersion: $P_1, P_2, P_3$

CROSS-BAND APOCHROMATIC CORRECTION AND APPLICATIONS IN THE LWIR AND SWIR BANDS

BACKGROUND

Optical imaging systems typically include optics that incorporate one or more reflecting and refracting components. When refractive optical elements are used within imaging systems, these components often take the form of lenses with one or two curvature radii crafted within a homogeneous material. Use of refractive optical elements introduces various types of geometric and chromatic aberrations onto an optical image plane.

Chromatic aberration is a type of distortion when a lens is either unable to bring all wavelengths of color to the same focal plane, and/or when wavelengths of color are focused at different positions in the focal plane. Chromatic aberration is caused by lens dispersion, where different colors of light travel at different speeds while passing through a lens, and therefore the lens fails to focus all colors to the same convergence point. This occurs because lenses have different refractive indices for different wavelengths of light. For example, FIG. 1 illustrates a perfect lens with no chromatic aberration, and all wavelengths are focused into a single focal point. However, in reality, the refractive index for each wavelength is different in lenses, which causes two types of chromatic aberration. The first type is longitudinal (or axial) chromatic aberration and is illustrated in FIG. 2. As shown in FIG. 2, longitudinal aberration occurs when different wavelengths of color do not converge at the same point after passing through a lens. The second type of chromatic aberration is lateral (or transverse) chromatic aberration and occurs when different wavelengths of color coming at an angle focus at different positions along the same focal plane, as illustrated in FIG. 3.

Multi-band refractive optical imaging systems are needed for applications such as infrared search and track (IRST) and forward looking infrared (FLIR) systems. For example, in some applications it is desirable that the optical system selectively provide two or more fields of view, such as a wide-angle field of view for general searching of a large area, and a narrow-angle field of view for higher-magnification, more specific analysis of a small portion of the scene of interest. Further, imaging sensors may be used in disparate (different) wavelength ranges, such as the short wave infrared (SWIR, 0.9-1.7 microns), medium wave infrared (MWIR, 3-5 microns) and/or long wave infrared (LWIR, 8-12 microns), such that one field of view is used in one wavelength range, and another field of view is used in another wavelength range. For instance, some applications may require a wide-angle field of view in the LWIR range, and a narrow-angle field of view in the SWIR range. However, there are only a finite number of materials that may be used to design such systems, and determining the best combination of materials can be difficult.

SUMMARY

Aspects and embodiments are directed to a system and method for designing a multi-band optical system that reduces the difficulty in determining the best combinations of materials that can be used in the system.

According to one embodiment, a method for cross-band apochromatic correction in a multi-element optical system comprises selecting a set of design wavelengths, wherein at least two design wavelengths are selected from disparate infrared (IR) bands, determining a set of optical materials that are transmissive at each design wavelength in the set of design wavelengths, identifying a system of linear equations that describe the multi-element optical system in terms of a normalized optical power over the set of design wavelengths, generating multiple solutions for the system of linear equations, each solution defining a set of design optical materials selected from the set of optical materials and based at least in part on calculating mean squared difference values for wavelength pair combinations of design wavelengths in the set of design wavelengths, determining a merit value for each solution of the multiple solutions using a merit function, the merit value based on minimizing the mean squared difference values, ranking the merit values of the multiple solutions, and using at least one solution of the multiple solutions to design the multi-element optical system.

In one example, the method further comprises setting a focal length of the multi-element optical system at a selected one design wavelength of the set of design wavelengths. According to another example, the method further comprises scaling each solution by the focal length.

According to one example, the method further comprises determining a refractive index for each optical material of the set of optical materials at each design wavelength of the set of design wavelengths. In another example, the merit function is based on a square root of the mean squared difference values. In another example, the merit function is based on an absolute sum of a normalized optical power of each design optical material of the set of design optical materials. According to another example, the merit function is further based on at least one optical property of each design optical material of the set of design optical materials. According to one example, ranking comprises ordering the merit values from smallest to largest.

In some examples, at least one design wavelength is a MWIR wavelength and at least one design wavelength is a LWIR wavelength. In other examples, at least one design wavelength is a SWIR wavelength and at least one design wavelength is a MWIR wavelength. In yet other examples, at least one design wavelength is a SWIR wavelength and at least one design wavelength is a LWIR wavelength. In another example, selecting a set of design wavelengths comprises selecting a first design wavelength that is a SWIR wavelength, a second design wavelength that is a first LWIR wavelength, and a third design wavelength that is a second LWIR wavelength. In one example, each solution includes a first lens material, a second lens material, and a third lens material selected from the set of design optical materials. In another example, the method further comprises selecting at least one additional lens material that functions as an afocal corrector and corrects for residual aberrations in the optical system caused by at least one of the first, second, and third lens materials.

According to one example, the set of optical materials comprises: barium fluoride ($BaF_2$), zinc selenide (ZnSe), multi-spectral zinc sulfide (ZnS) (Cleartran™), AMTIR-2 (AsSe), IRG26, gallium arsenide (GaAs), arsenic trisulfide ($As_2S_3$), and cadmium telluride (CdTe).

In one example, the method further comprises sending at least one solution of the multiple solutions to a lens generating system.

According to another embodiment, an optimization engine for generating multiple solutions for cross-band apochromatic correction in a multi-element optical system comprises a memory having stored therein at least one optical property associated with each of a plurality of optical materials, an input configured to receive design parameters of the multi-element optical system, the design parameters including a set of design wavelengths, wherein at least two design wavelengths are from disparate infrared (IR) bands, at least one processor coupled to the memory and the input and configured to: identify from the plurality of optical materials a set of optical materials that are transmissive at each design wavelength in the set of design wavelengths, identify a system of linear equations that describe the multi-element optical system in terms of a normalized optical power over the set of design wavelengths, generate multiple solutions for the system of linear equations, each solution defining a set of design optical materials selected from the set of optical materials and based at least in part on calculating mean squared difference values for wavelength pair combinations of design wavelengths in the set of design wavelengths, determine a merit value for each solution of the multiple solutions using a merit function, the merit value based on minimizing the mean squared difference values, and rank the merit values of the multiple solutions. The optimization engine also comprises an output coupled to the at least one processor that is configured to receive and display the ranked merit values and the respective solution.

In one example, the processor is further configured to select a solution based on the ranked merit values and the output is configured to display the selected solution. In another example, the processor is further configured to set a focal length of the multi-element optical system at a selected one design wavelength of the set of design wavelengths. According to another example, the processor is further configured to scale each solution by the focal length.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments," "certain embodiments," or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
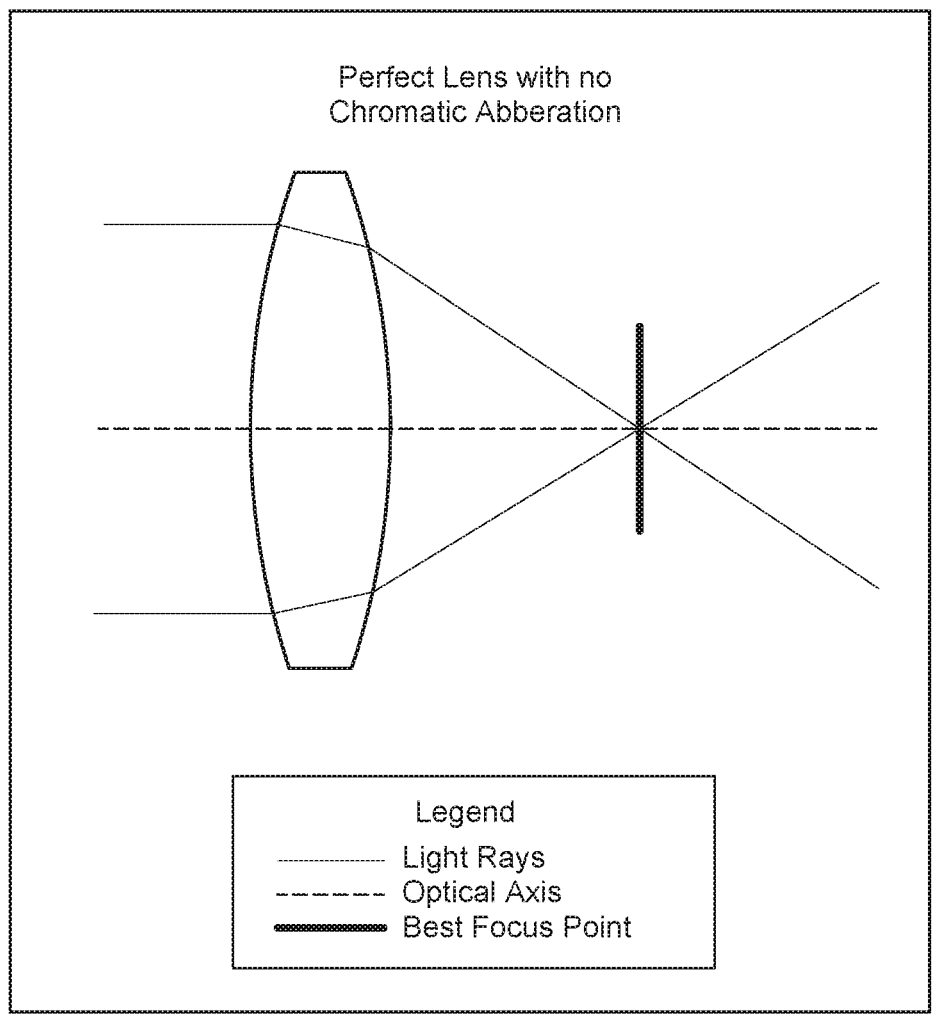
FIG. 1 is a diagram illustrating a perfect lens with no chromatic aberration.
Figure 3:
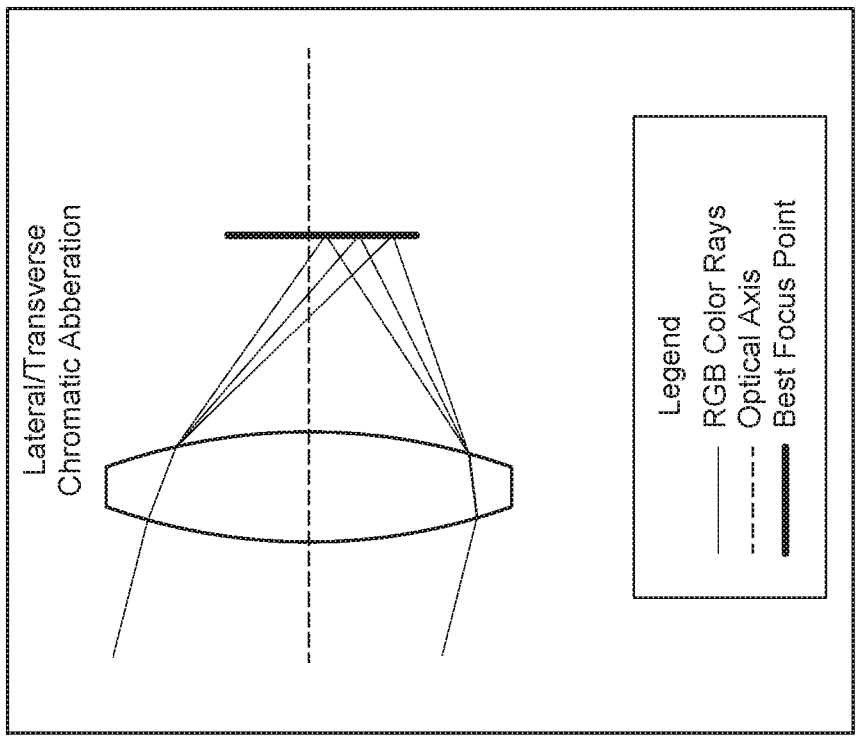
FIG. 3 is a diagram illustrating a lens exhibiting lateral or transverse chromatic aberration.
Figure 2:
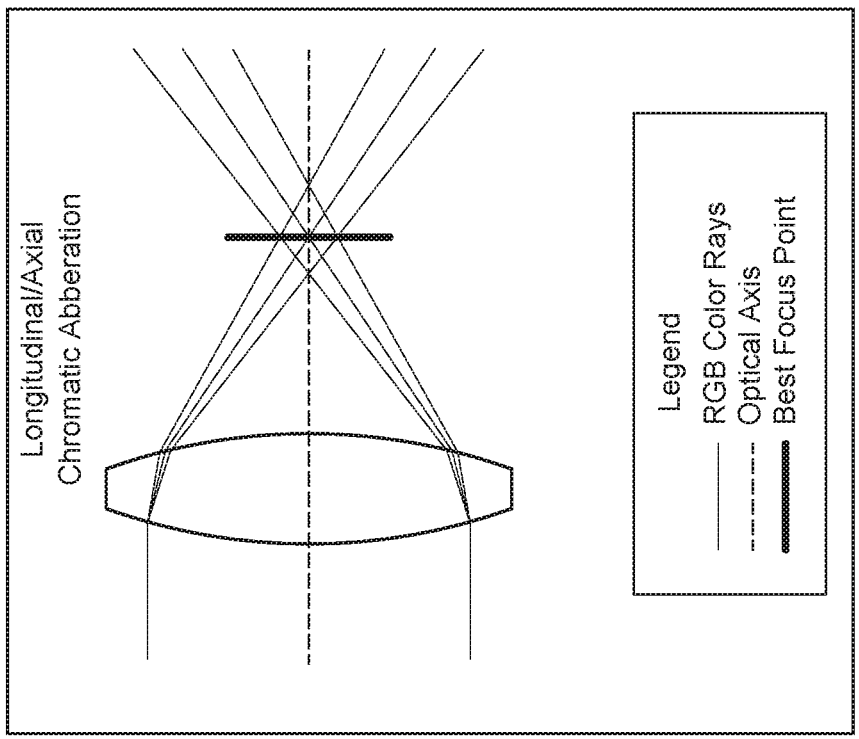
FIG. 2 is a diagram illustrating a lens exhibiting longitudinal or axial chromatic aberration.

Aspects and embodiments are directed to systems and methods for designing a refractive optical system that operates over multiple infrared (IR) bands. According to at least one embodiment, a method and system are disclosed that provide apochromatic correction across disparate spectral bands (also referred to herein as cross-band or multi-band). One or more of the embodiments disclosed herein may be applied to applications where at least two design wavelengths are selected from disparate IR bands. For instance, the systems and methods described herein may be used in applications where at least one design wavelength is a SWIR and at least one design wavelength a LWIR. Likewise, the methods and systems disclosed herein may be applied to applications where at least one design wavelength is SWIR and at least one design wavelength is MWIR, as well as applications where at least one design wavelength is MWIR and at least one design wavelength is LWIR. As one example, and as discussed above, there are few materials that have good transmission over both the SWIR and LWIR bands, and determining the best combination of materials can prove to be difficult. The disclosed method and system gives a method for designing systems directed to applications covering disparate IR bands by ranking combinations of optical materials based on certain design criteria and the optical properties of the materials. One or more of the combinations of optical materials may then be used as lenses in an optical system, such as a refractive telescope. The concepts and methods disclosed herein may be used to implement a cross-band apochromatic system for a specific system using three chosen wavelengths, and according to a further aspect, a general solution may be used for an arbitrary set of wavelengths. The methods disclosed herein may also be expanded for objective lenses with more than three lens elements. The methods disclosed herein may be used for designing objective lenses and telescope designs. An additional aspect allows for residual aberrations of the system to be corrected.

The aspects disclosed herein in accordance with the present invention, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any reference to front or back, left and right, top and bottom, upper and lower, and vertical and horizontal are intended for convenience of description not to limit the present systems and methods or their components to any one positional or spatial orientation.

Figure 4:
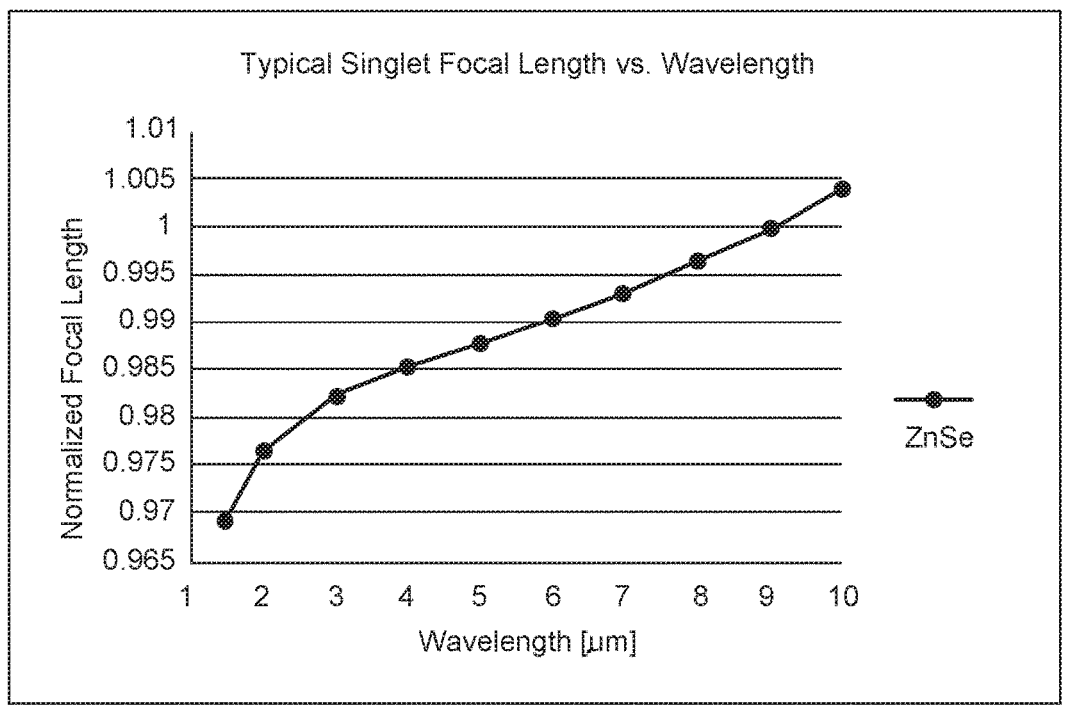
FIG. 4 is a graph that plots the normalized focal length of a single lens versus wavelength.

Dispersion in optical systems occurs because the angle of refraction of the beam depends upon the index of refraction of the refractive material. Since the index of refraction varies as a function of wavelength, the outgoing light beam is color separated. As a result, a lens made form a single material will have a focal length that varies with wavelength. Thus, only a single wavelength will be in focus, and the image will go out-of-focus as the wavelength changes. This phenomenon is illustrated in FIG. 4, where the normalized focal length of a single lens made from ZnSe is plotted versus wavelength. The graph in FIG. 4 illustrates that the focal length varies monotonically with wavelength.

Figure 5:
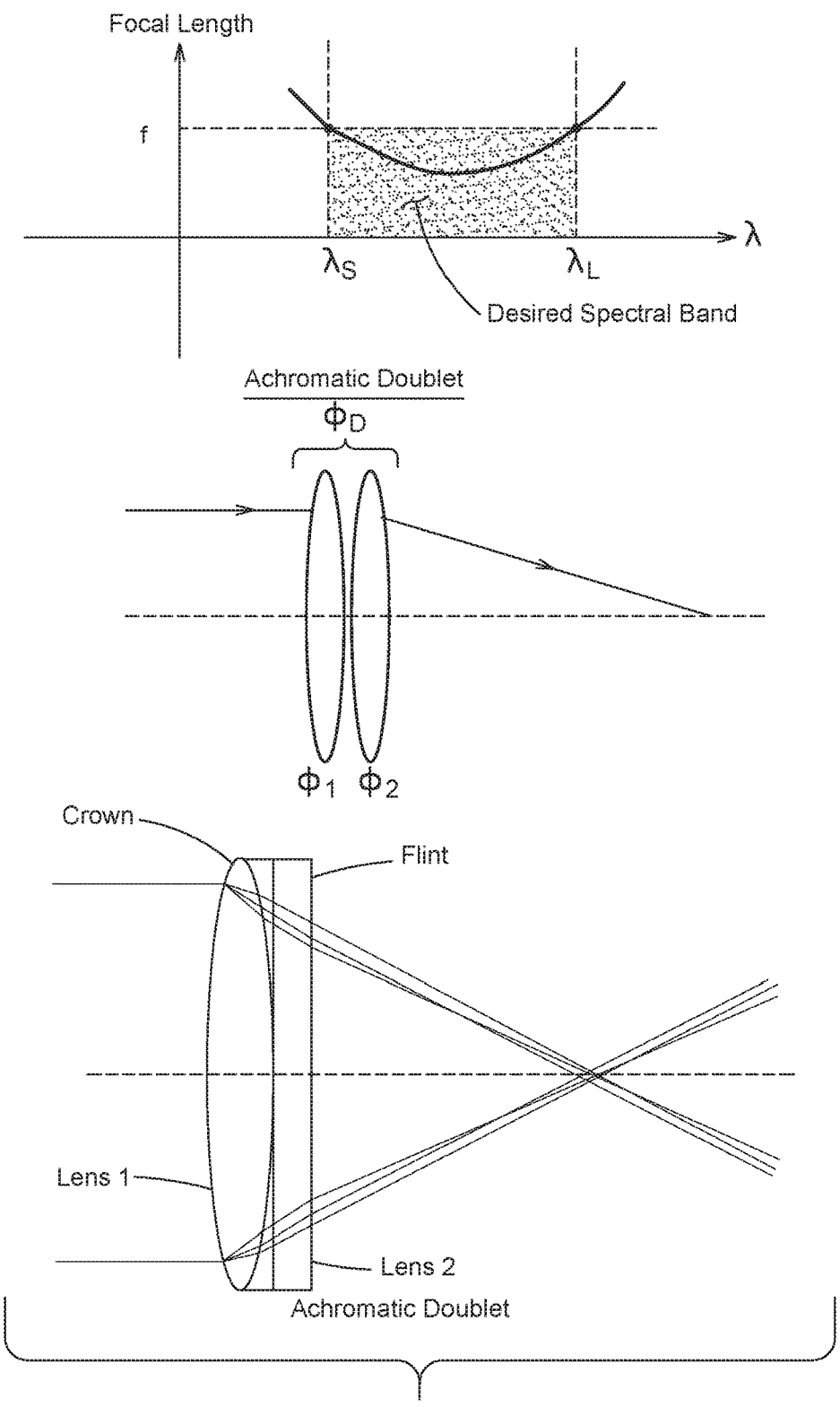
FIG. 5 is a series of diagrams illustrating a single band achromatic doublet that includes two lenses.

To correct such problems, achromatic lenses may be used to bring two wavelengths (such as red and blue) into focus in the same plane. The top portion of FIG. 5 plots focal length (y-axis) as a function of wavelength (x-axis) for a single band bounded by a short wavelength ($\lambda_S$) and a long wavelength (($\lambda_L$). In general, the two wavelengths are chosen near the edges of the desired spectral band, and as shown, the focal length varies across the desired spectral band. FIG. 5 includes an example of the most common type of achromat, the achromatic doublet. The achromatic doublet includes two individual lenses made from different materials (and therefore different dispersions) so that the resulting combination results in a lens having a focal length that is the same at two wavelengths. For example, the bottom portion of FIG. 5 illustrates an achromatic doublet that includes a first lens that is a positive (convex or converging) element made from a material having a low dispersion, and a second lens that is a negative (concave or diverging) element made from a material having a higher dispersion. The separate lens elements may be joined together (see bottom of FIG. 5) and shaped such that the chromatic aberration of one lens is counterbalanced by the other. However, in some applications the lens elements are not joined together, but may still function with one another to create the same effect (i.e., a constant focal length across multiple wavelengths).

Figure 6:
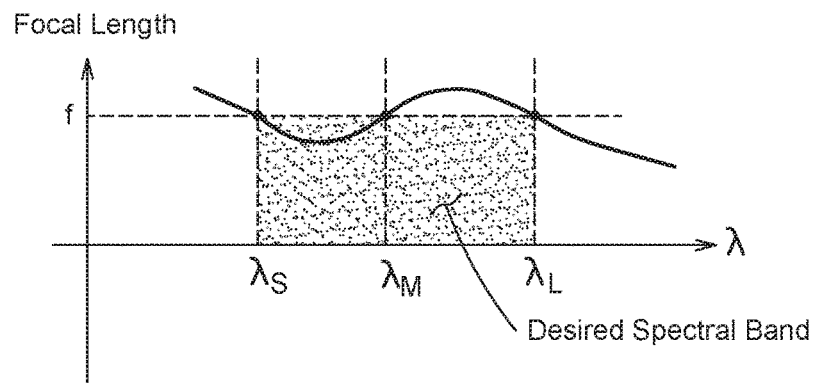
FIG. 6 is a series of diagrams illustrating a single band apochromatic triplet that includes three lenses.
Figure 6:
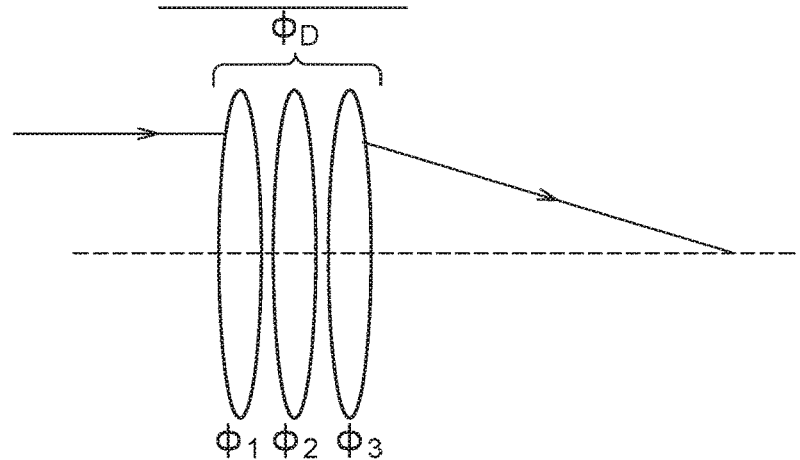
Figure 6:
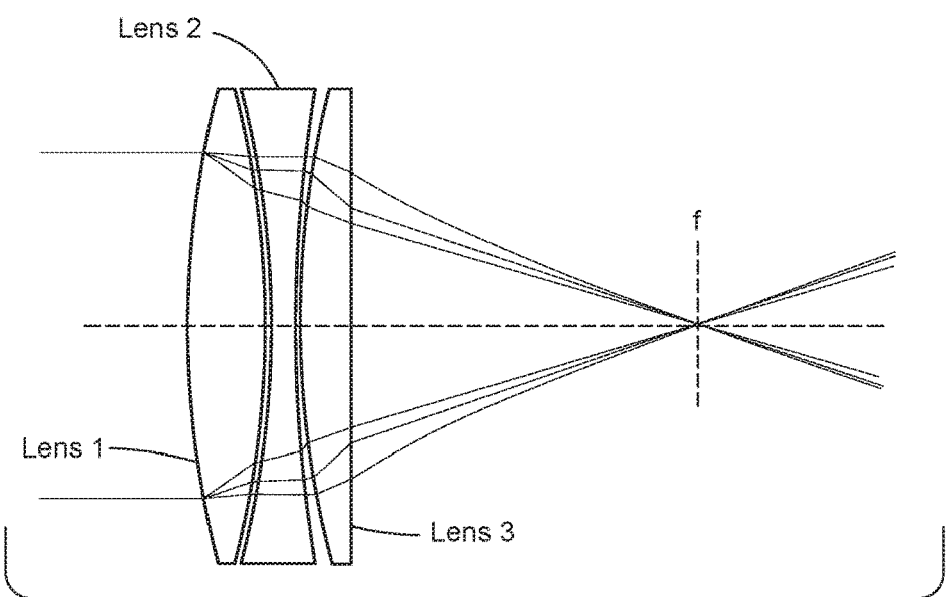

Apochromatic lenses may be used to correct chromatic aberration by bringing three wavelengths (such as red, green, and blue) into focus in the same plane. In addition, these systems typically have at least three elements and are typically designed so that the difference between the primary focus point and the focus point of the remaining colors (such as blue) is extremely small. The graph illustrated in the top portion of FIG. 6 plots focal length (y axis) as a function of wavelength (x-axis) for a single band of wavelengths and includes a medium wavelength ($\lambda_M$) disposed between the short and long wavelengths. Again, the focal length varies as a function of wavelength. FIG. 6 includes an example of an apochromatic triplet (see bottom of FIG. 6) that includes three individual lenses, including two positive lenses and a negative lens.

Figure 7A:
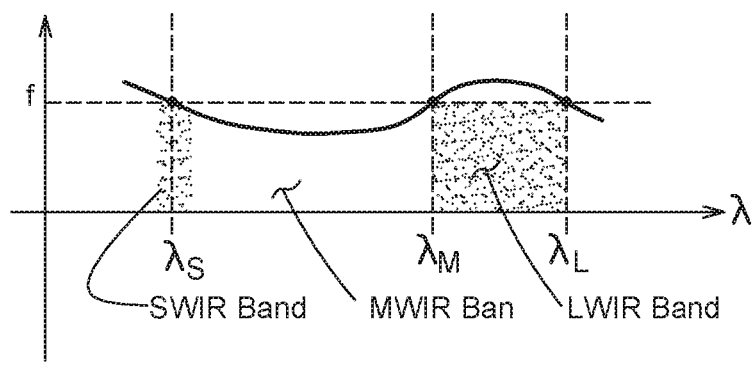
FIG. 7A is a diagram illustrating a cross-band apochromatic triplet in accordance with one or more aspects of the present invention.
Figure 7A:
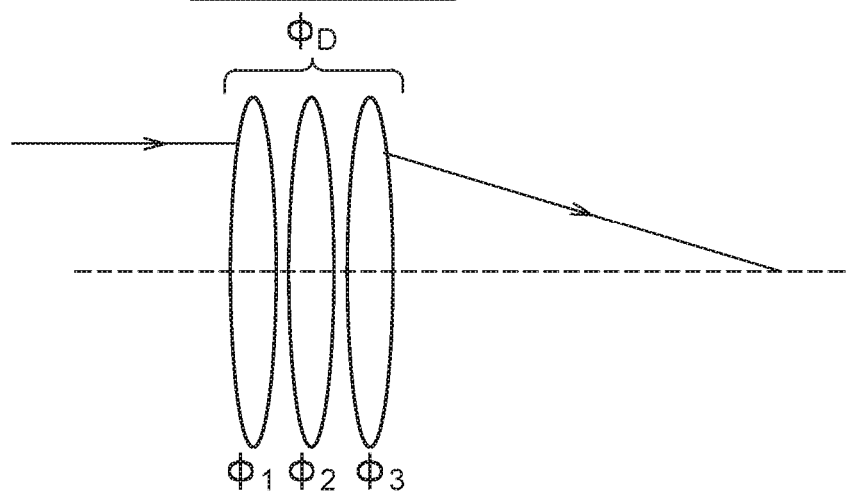

Referring to FIG. 7A, the concept of FIG. 6 which is applied to three wavelengths over a single band, is expanded to address a design application using three wavelengths chosen over two disparate bands. For example, the first band may include one or more design wavelengths chosen in the SWIR band, and the second band may include one or more design wavelengths chosen in the LWIR band. One of the advantages of the system and method of the current disclosure is to provide a design of the optics such that it compensates for the variation of the refractive index over the disparate bands. According to at least one embodiment, the first band in the SWIR may include a single wavelength (shown as $\lambda_S$ in FIG. 7A) and the second band may include the range of wavelengths spanning between (and including) a first LWIR wavelength ($\lambda_M$) and a second LWIR wavelength ($\lambda_L$), although in some embodiments, the first LWIR wavelength may be a wavelength that is typically considered to be in the MWIR region.

It will be appreciated that the scope of this disclosure may also be expanded to apply to applications that use three wavelengths chosen over three disparate bands, or any other application where multiple wavelengths are chosen over multiple bands.

The cross-band apochromatic triplet shown in the cross-band configuration shown in FIG. 7A includes three thin lens elements (where thickness is negligible compared to focal length) that can be characterized by a number of different properties, including the lens power ($\phi$) (otherwise referred to herein as optical power), i.e., the ability to bend light. The optical power of a lens is defined as the inverse of its focal length. The optical power for a single thin lens element (k), for a wavelength may be expressed generally as Equation (1) below:

$$\phi_k = (n_{k,\lambda} - 1)\Delta c_k \qquad \text{Equation (1):}$$

where
$n_{k,\lambda}$ is the refractive index at a certain wavelength (e.g., the refractive index at the first LWIR design wavelength, which would be designated as $n_{k,M}$) for element k (e.g., according to this example, there are three elements), and
$\Delta c_k$ is the surface curvature difference for element k.

Further, the cross-band Abbe number V, may be used to characterize the relative dispersive properties of a material, and for each element k may be expressed as Equation (2) below:

$$V_k = \frac{n_{k,M} - 1}{n_{k,S} - n_{k,L}} \qquad \text{Equation (2)}$$

where
$n_{k,S}$ is the refractive index at the short wavelength (e.g., the SWIR design wavelength) for element k, and
$n_{k,L}$ is the refractive index at the long wavelength (e.g., the second LWIR design wavelength) for element k.

An additional property of the optical materials that comprise k is the cross-band relative partial dispersion, P, which is defined by Equation (3) below:

$$P_k = \frac{n_{k,M} - n_{k,L}}{n_{k,S} - n_{k,L}} \qquad \text{Equation (3)}$$

A desired focal length $f_D$ (also referred to herein as the design focal length) in the system comprising multiple thin lenses according to FIG. 7A, can be expressed as Equation (4) below:

$$\frac{1}{f_D} = \frac{1}{f_1} + \frac{1}{f_2} + \frac{1}{f_3} \qquad \text{Equation (4)}$$

where
$f_1$, $f_2$, and $f_3$ are the focal lengths of each lens element (i.e., $f_k$).

According to various aspects, the design requirement for the lens power may be computed at the middle wavelength $\lambda_M$, and the desired power for the final lens may be expressed below as Equation (5):

$$\phi_1 + \phi_2 + \phi_3 = \phi_D \qquad \text{Equation (5):}$$

where
$\phi_1$, $\phi_2$, and $\phi_3$ are the lens powers of each lens element (i.e., $\phi_k$, otherwise referred to herein as the predicted lens power), and
$\phi_D$ is the desired (design) power of the final lens (also referred to herein as the design lens).

In accordance with at least one embodiment, Equation (5) can be converted to normalized units by dividing both sides of the equation by the desired design power $\phi_D$, as shown generally by Equation (6):

$$\frac{\phi_1}{\phi_D} + \frac{\phi_2}{\phi_D} + \frac{\phi_3}{\phi_D} = \bar{\phi}_1 + \bar{\phi}_2 + \bar{\phi}_3 = 1 \qquad \text{Equation (6)}$$

where $\bar{\phi}_k = \frac{\phi_k}{\phi_D}$

In accordance with various aspects, the conditions for apochromaticity include both Equation (7) ((associated with the power difference at the longest and shortest wavelengths) and Equation (8) (associated with the power difference at the middle and longest wavelength) as expressed below:

$$\frac{\bar{\phi}_1}{V_1} + \frac{\bar{\phi}_2}{V_2} + \frac{\bar{\phi}_3}{V_3} = 0 \qquad \text{Equation (7)}$$

$$P_1 \frac{\bar{\phi}_1}{V_1} + P_2 \frac{\bar{\phi}_2}{V_2} + P_3 \frac{\bar{\phi}_3}{V_3} = 0 \qquad \text{Equation (8)}$$

Thus, for a system as illustrated in FIG. 7A, the solution to Equations (6), (7), and (8) can be expressed as the system of equations shown in Equation (9) below:

$$\bar{\phi}_1 = \frac{(P_2 - P_3)V_1}{P_1(V_3 - V_2) + P_2(V_1 - V_3) + P_3(V_2 - V_1)} \qquad \text{Equation (9)}$$

$$\bar{\phi}_2 = \frac{(P_3 - P_1)V_2}{P_1(V_3 - V_2) + P_2(V_1 - V_3) + P_3(V_2 - V_1)}$$

$$\bar{\phi}_3 = \frac{(P_1 - P_2)V_3}{P_1(V_3 - V_2) + P_2(V_1 - V_3) + P_3(V_2 - V_1)}$$

The final lens element powers may be given by scaling the results by the desired focal length of the composite lens, $\phi_D$, as shown by Equation (10):

$$\phi_k = \bar{\phi}_k \phi_D \qquad \text{Equation (10):}$$

The equations shown in (9) and (10) give the solutions for the normalized lens element powers such that the focal length will be the same at the three wavelengths $\lambda_S$, $\lambda_M$, and $\lambda_L$.

According to a further aspect, a merit function may be used to rank the solutions. For instance, according to one embodiment, a merit function, one example of which is expressed as Equation (11) below, may represent the absolute sum of the normalized lens powers:

$$M_1(\bar{\phi}_1, \bar{\phi}_2, \bar{\phi}_2) = |\bar{\phi}_1| + |\bar{\phi}_2| + |\bar{\phi}_3| \qquad \text{Equation (11):}$$

High optical powers may lead to lenses with steep surface curvatures that contribute to high spatial aberrations. Thus, low values for the merit value $M_1$ may be desired.

According to another embodiment, a second merit function, one example of which is expressed as Equation (12) below, may be used to assist in discriminating between solutions. According to some embodiments, the second merit function may be based on the Petzval curvature of the composite lens. Petzval curvature leads to an image plane that is curved, and therefore a flat image plane is generally more desirable.

$$M_2(\bar{\phi}_1, \bar{\phi}_2, \bar{\phi}_2) = \frac{\bar{\phi}_1}{n_1} + \frac{\bar{\phi}_2}{n_2} + \frac{\bar{\phi}_3}{n_3} \qquad \text{Equation (12)}$$

where $n_1$, $n_2$, and $n_3$ represent the index of refraction.

The index of refraction n for each element k at each wavelength ($\lambda_S$, $\lambda_M$, and $\lambda_L$) can be obtained from the manufacturer or supplier of the optical material. Suppliers of optical materials may also provide the Abbe number V and/or the partial dispersion P values. As discussed above, the number of known materials that are transmissive in both the SWIR and LWIR bands is limited. Non-limiting examples of such materials includes: barium fluoride ($BaF_2$), zinc selenide (ZnSe), multi-spectral zinc sulfide (ZnS) (Cleartran™), AMTIR-2 (AsSe), IRG26, gallium arsenide (GaAs; transmissive from approximately 2-11 microns), arsenic trisulfide ($As_2S_3$; transmissive from approximately 0.7-11 microns), and cadmium telluride (CdTe).

Figure 8:
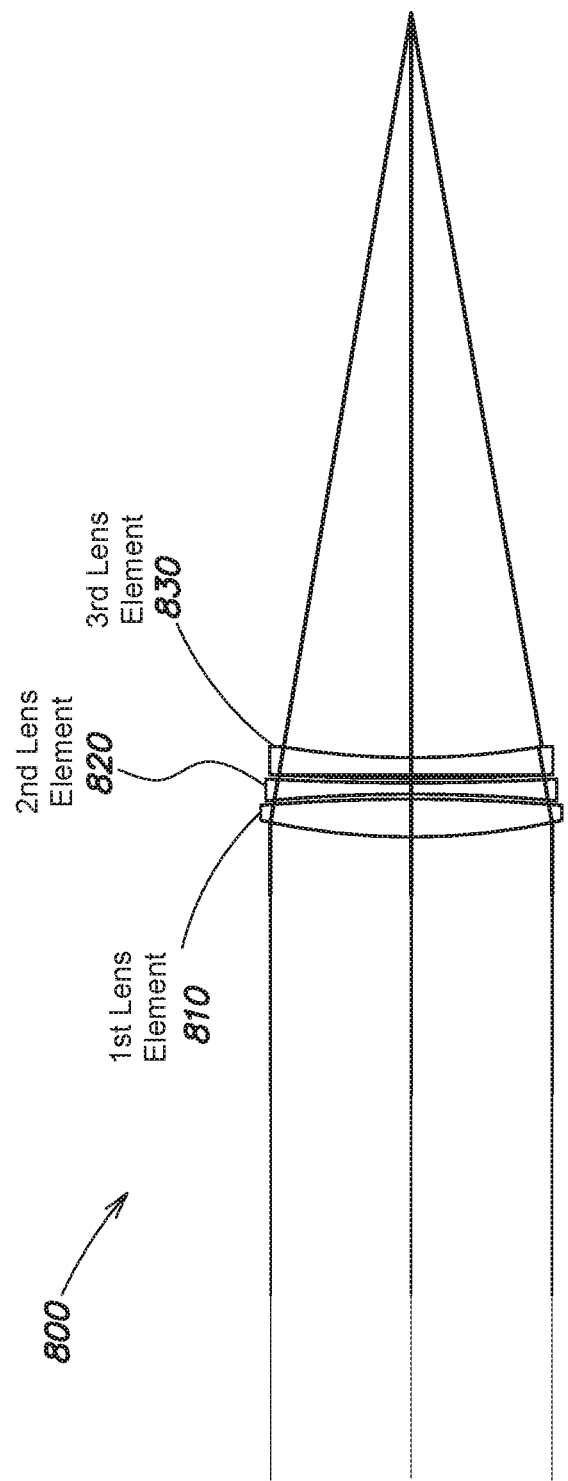
FIG. 8 is a diagram illustrating a cross-band apochromatic triplet that includes three lenses in accordance with aspects of the present invention.

Once the merit values for each solution are ranked, a designer may use one or more of the solutions to design a multi-band optical system, such as the apochromatic triplet shown in FIG. 8, which includes first, second, and third lens elements that are each constructed from respective optical materials used to form the solution. For example, FIG. 8 illustrates a single compound objective 800 constructed from three different lenses (810, 820, and 830) of different materials that are mated or otherwise joined together. For instance, the first lens element 810 may be convex in shape and constructed from multi-spectral ZnS (Cleartran™), the second lens element 820 may be concave in shape and constructed from $BaF_2$, and the third lens element 830 may be a meniscus lens constructed from CdTe. It will be appreciated that the example triplet shown in FIG. 8 is just one example of a combination of lenses that may be used. Other materials, configurations (e.g., lenses that work in combination, but are not necessarily joined together), and shapes of lenses that are either converging or diverging (e.g., flat, concave, convex, plano-convex, plano-concave, concave-convex, meniscus, etc.) are also within the scope of this disclosure.

Figure 7B:
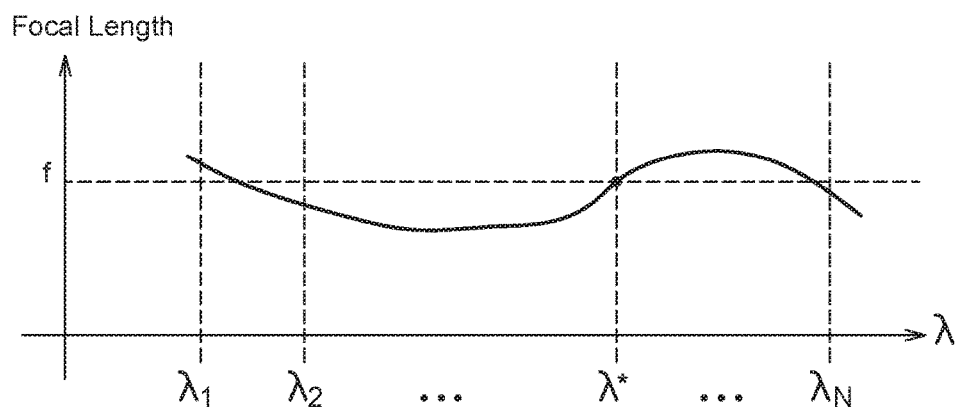
FIG. 7B is a diagram illustrating a generalized cross-band optical system in accordance with one or more aspects of the present invention.

The examples and embodiments discussed above address an apochromatic solution for three arbitrary wavelengths such as shown in FIG. 7A. According to a further aspect, a more generalized solution may be used that minimizes the variation in the optical power of the lens over an arbitrary set of wavelengths, such as the system shown in FIG. 7B. In certain instances, the generalized solution provides information regarding the optical power at other surrounding wavelengths. Referring to FIG. 7B, an arbitrary number of wavelengths, N, may be selected by a system designer, and the focal length may be set to the exact value for one wavelength, $\lambda^*$, in the set. According to one or more aspects of this generalized approach, the mean square error of the differences of the lens power at pairs of wavelengths may be minimized, and solutions that have minimal variation in optical power over the wavelengths may be preferred. A more detailed description of this approach is discussed below.

In a similar manner as discussed above in reference to Equation 6, a normalized lens power may equal 1 for one particular design wavelength $\lambda^*$. According to other embodiment, the normalized lens power may be averaged over a band. Choosing the specifics for normalized powers may be a decision made by the system designer. The normalized optical power of the composite lens at a wavelength, $\lambda_m$, may be given by Equation (13):

$$s(\lambda_m) = \frac{[n_1(\lambda_m) - 1]}{[n_1(\lambda^*) - 1]} \bar{\phi}_1 + \frac{[n_2(\lambda_m) - 1]}{[n_2(\lambda^*) - 1]} \bar{\phi}_2 + \frac{[n_3(\lambda_m) - 1]}{[n_3(\lambda^*) - 1]} \bar{\phi}_3 \quad \text{Equation (13)}$$

where $n_k(\lambda_m)$ is the index of refraction for the $k^{th}$ lens element at wavelength $\lambda_m$ and is $n_k(\lambda^*)$ is the index of refraction for the $k^{th}$ lens element at wavelength $\lambda^*$. According to an alternative embodiment, $n_k(\lambda^*)$ may be replaced by $\bar{n}_k$.

It is desired that $s(\lambda)$ of Equation (13) equals 1 for all wavelengths. The error that is chosen to be minimized may be associated with the mean square difference of the optical power over pairs of wavelengths, and is expressed below by Equation (14). According to various aspects, all unique combinations may be considered.

$$MSE = \frac{1}{N_c} \sum_m \sum_n [s(\lambda_m) - s(\lambda_n)]^2 \quad \text{Equation (14)}$$

where $N_c$ is the number of wavelength pair combinations. To simplify the notation, a ratio may be defined as shown by Equation (15):

$$R_k(m, n) = \frac{[n_k(\lambda_m) - n_k(\lambda_n)]}{[n_k(\lambda^*) - 1]} \quad \text{Equation (15)}$$

For a given set of lens materials, the solution of normalized optical powers that gives the minimum mean square error of the lens power over the set of wavelength pairs and has a normalized optical power of unity at the design wavelength $\lambda^*$ is given by the solution of three linear equations, including Equation (6), as discussed above, and Equations (16) and (17) as shown below:

$$\bar{\phi}_1 \frac{1}{N_c} \sum_m \sum_n R_1(m, n)[R_1(m, n) - R_2(m, n)] + \quad \text{Equation (16)}$$

$$\bar{\phi}_2 \frac{1}{N_c} \sum_m \sum_n R_2(m, n)[R_1(m, n) - R_2(m, n)] +$$

$$\bar{\phi}_3 \frac{1}{N_c} \sum_m \sum_n R_3(m, n)[R_1(m, n) - R_2(m, n)] = 0$$

$$\bar{\phi}_1 \frac{1}{N_c} \sum_m \sum_n R_1(m, n)[R_1(m, n) - R_3(m, n)] + \quad \text{Equation (17)}$$

$$\bar{\phi}_2 \frac{1}{N_c} \sum_m \sum_n R_2(m, n)[R_1(m, n) - R_3(m, n)] +$$

$$\bar{\phi}_3 \frac{1}{N_c} \sum_m \sum_n R_3(m, n)[R_1(m, n) - R_3(m, n)] = 0$$

As will be recognized, once the coefficients are computed in Equations (6), (16), and (17), the equations may be solved using standard methods to invert the 3×3 matrix. According to a further aspect, after the normalized element lens powers are computed, the square root of the mean square error (MSE) may provide a metric of the quality of the solution, i.e., a merit value, with smaller values associated with more preferred solutions. The root of the mean square error (RMS) for the solution may be expressed as Equation (18) below:

$$\text{RMS} = \sqrt{\frac{1}{N_c} \sum_m \sum_n [R_1(m,n)\overline{\phi}_1 + R_2(m,n)\overline{\phi}_2 + R_3(m,n)\overline{\phi}_3]^2} \quad \text{Equation (18)}$$

The final lens element powers may be given by scaling the results by the desired focal length of the composite lens, as discussed above in reference to Equation (10). According to some embodiments, the merit functions $M_1$ and $M_2$ discussed above in reference to Equations (11) and (12) may be applied to determine a final solution.

Figure 9:
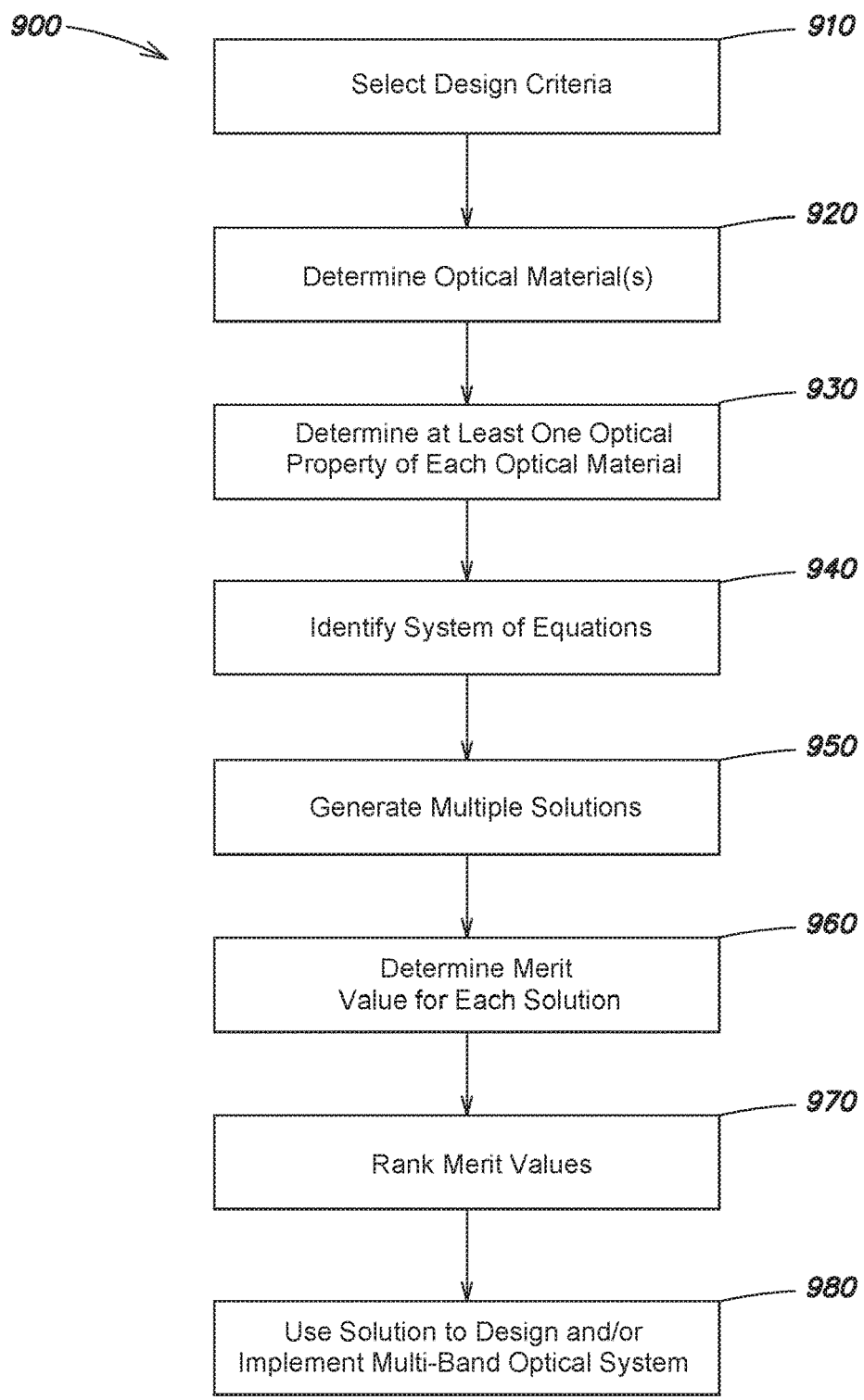
FIG. 9 is a flow diagram of an example cross-band apochromatic correction process in accordance with aspects of the present invention.

FIG. 9 is a flow diagram for one example of a cross-band apochromatic correction process 900 using the functions and algorithms discussed above. According to various aspects, the process 900 may be used for cross-band apochromatic correction in a multi-element optical system. One or more acts of the process 900 may be performed by an optimization engine using a computer system as discussed further below in reference to FIGS. 12 and 13.

The process begins at step 910 where design criteria are selected, such as the design wavelengths (e.g., $\lambda_S$, $\lambda_M$, and $\lambda_L$) and the design wavelength $\lambda^*$ that are to be used in a desired application. The design wavelengths may be chosen in disparate bands, such that a first design wavelength may be a SWIR wavelength ($\lambda_S$), a second design wavelength may be a first LWIR wavelength ($\lambda_M$), and a third design wavelength may be a second LWIR wavelength ($\lambda_L$). At step 920, one or more optical materials that are transmissive at each design wavelength in the set of design wavelengths are identified or otherwise determined. For example, these materials may include one or more of the list of materials discussed above that are transmissive in the LWIR and SWIR bands. At step 930 at least one optical property may be determined for each optical material identified in step 920. For example, a refractive index may be obtained from data provided by the lens manufacturer for each of the optical materials at each of the design wavelengths. This data may be input to an optimization engine, as described below, by a user, such as a system designer. Other optical properties for each of the optical materials may also be calculated, such as the lens power using Equation (1) above, the Abbe number using Equation (2), and the partial dispersion using Equation (3).

At step 940, a system of equations is identified that describe or define a relationship between the design wavelengths and properties of each identified optical material. For example, step 940 may include identifying a system of equations that describe the optical system in terms of a normalized optical power over the design wavelengths. In some embodiments, the system of equations may be represented by Equation (6), (16), and (17) above. At step 950, multiple solutions for the system of equations are generated. Each solution may define a set of design optical materials selected from the set of design optical materials identified in step 920 and may be based at least in part on calculating mean squared difference values for wavelength pair combinations of design wavelengths.

At step 960, a merit value is determined for each solution found in step 950. For instance, Equation (18) may be used to find the root mean square of each solution, and the respective values may then subsequently be ranked (at step 970). For instance, the merit values associated with each solution may be ranked from smallest to largest, where each solution yields a combination of materials that may then be used, at step 980, in a design and/or implemented into a multi-band, multi-element optical system. For example, for a solution that yields first, second, and third optical materials, a design lens may be constructed using the combination of these materials. According to a further example, at least one solution can be sent to a lens generating system that can be used to physically construct one or more design lenses using the materials associated with the solution.

Process 900 depicts one particular sequence of acts in a particular embodiment. The acts included in this process may be performed by, or using, one or more computer systems (as discussed below in reference to FIGS. 12 and 13) that may be specially configured as discussed herein. Some acts are optional and, as such, may be omitted in accord with one or more embodiments. Additionally, in certain instances the order of the acts can be altered, or other acts can be added, without departing from the scope of the embodiments described herein. Furthermore, as described more below, in at least one embodiment, the acts are performed on particular, specially configured machines, namely an optimization engine or system configured according to the examples and embodiments disclosed herein.

Figure 10:
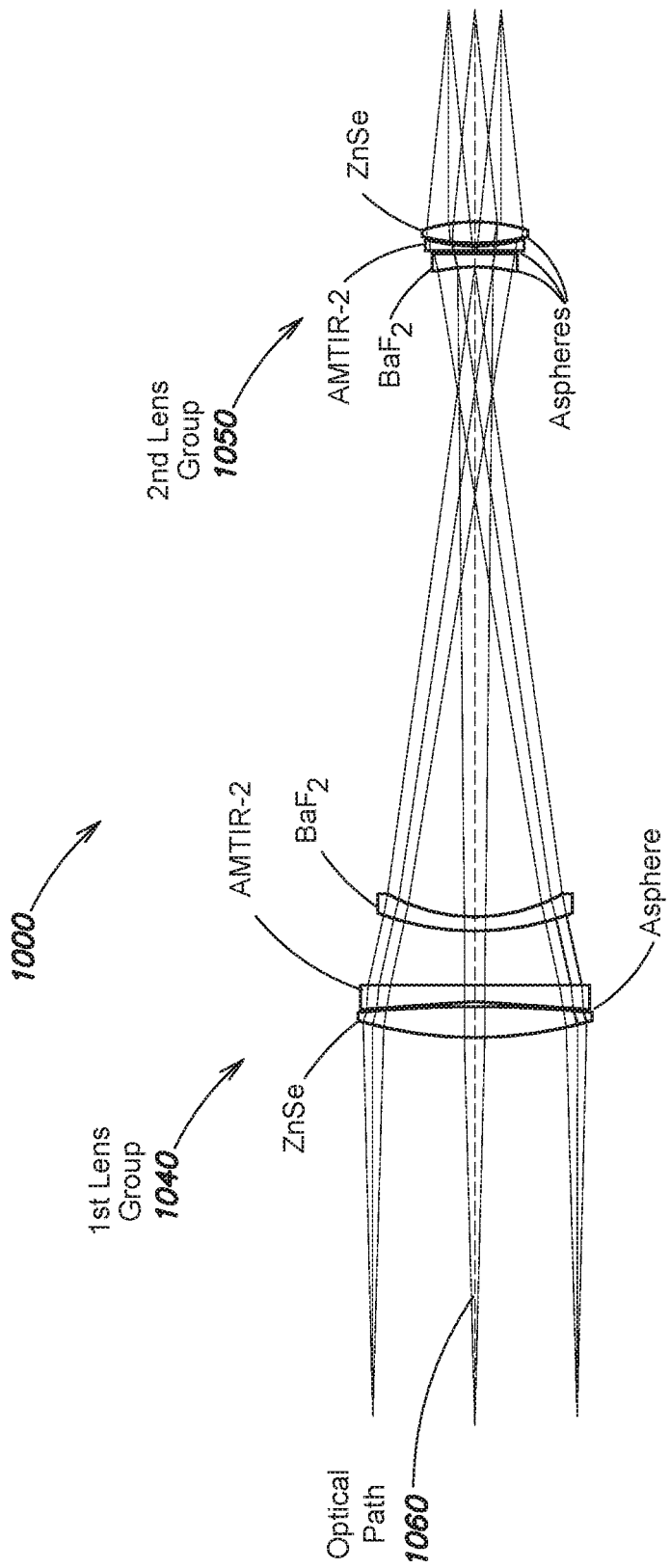
FIG. 10 is a diagram illustrating an example of a dual band refractive telescope in accordance with aspects of the present invention.

Each solution obtained from the process shown in FIG. 9 may be used in the design of an optical system. For instance, each solution may form a compound lens or a set of lenses used in combination that are installed or otherwise used in one or more applications, such as a telescope (e.g., reflective or refractive) or any other optical device that may be used in an imaging system. FIG. 10 illustrates a single field-of-view dual band (e.g., SWIR and LWIR as discussed above in reference to FIG. 7A) refractive telescope 1000 where a solution that yields lens elements ZnSe, AMTIR-2, and $BaF_2$ includes using these three lens elements in two separate lens groups, including a first lens group 1040 and a second lens group 1050. Each group of lenses is positioned in the optical path 1060 of one or more light beams.

Figure 11:
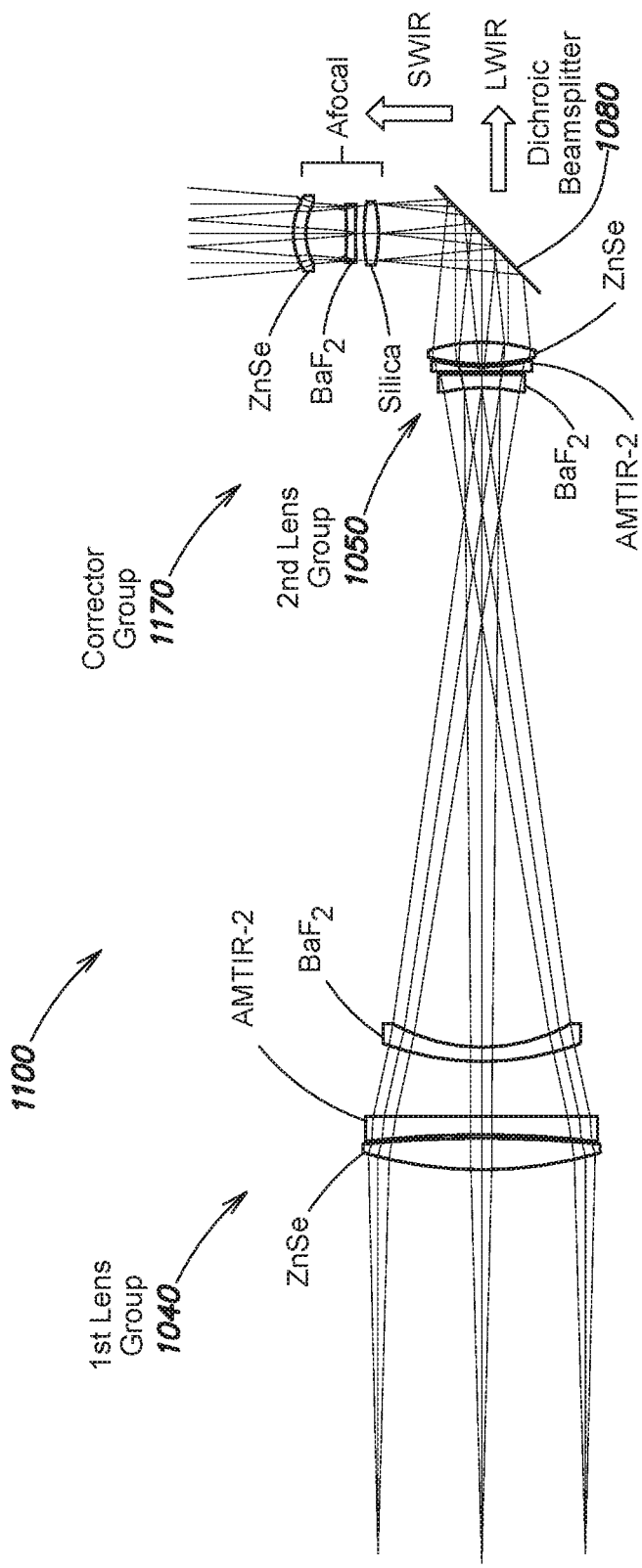
FIG. 11 is a diagram illustrating an example of an additional chromatic correction in accordance with aspects of the present invention.

According to a further embodiment, an additional chromatic and/or spatial correction may be performed to an optical design that includes at least one of the solutions. For example, residual aberrations caused by at least one of the design wavelengths (in this particular example, at least one of the first, second, and third design wavelengths) may be corrected by selecting at least one additional lens material that functions as an afocal corrector. In certain instances, the at least one additional lens material may include multiple lenses. For example, residual dispersion of the telescope shown in FIG. 10 in the SWIR band may be reduced by the addition of an SWIR corrector group 1170 and a dichroic beam splitter 1080, as shown generally at 1100 in FIG. 11. As shown, FIG. 11 includes an example where the first and second lens groups 1040 and 1050 from FIG. 10 further include three additional lens elements ZnSe, $BaF_2$, and silica that collectively form a corrector group of lenses 1170, (also referred to as an afocal dispersion correcting lens group) that are positioned after the dichroic beam splitter 1080. In this case, the corrector group is also afocal and since it is only addressing the SWIR band, it may use materials that exhibit low transmission in the LWIR (such as silica).

According to some embodiments, one or more of the operations and/or functions described herein, such as one or more of the acts discussed in process 900 of FIG. 9 discussed above, may be implemented on one or more computer systems. These computer systems may be specially configured computers such as those based on Intel Atom, Core, or PENTIUM-type processors, IBM PowerPC, AMD Athlon or Opteron, SGI MIPS, Sun UltraSPARC, or any other type of processor. Additionally, any system may be located on a single computer or may be distributed amongst a plurality of computers attached by a communications network.

A special-purpose computer system can be specially configured to perform the operations and/or functions as disclosed herein. According to some embodiments, the special-purpose computer system is configured to perform any of the described operations and/or algorithms. The operations and/or algorithms described herein can also be encoded as software executing on hardware that defines a processing component that can define portions of a special purpose computer, reside on an individual special-purpose computer, and/or reside on multiple special-purpose computers.

Figure 12:
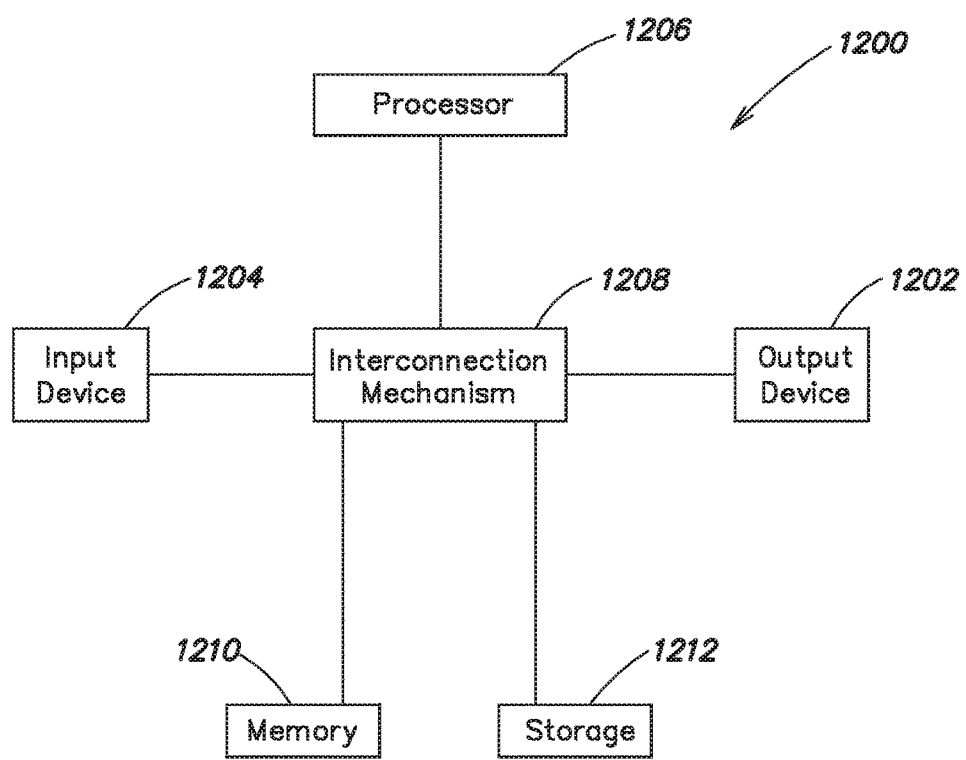
FIG. 12 is a first block diagram of an example of a distributed database system in which various aspects of the present invention may be practiced.

According to one embodiment, an optimization engine for generating multiple solutions for a multi-band optical system is provided. The optimization engine may be executed using an example special-purpose computer system 1200, as shown in FIG. 12 on which various aspects of the present invention may be practiced. For example, computer system 1200 may include a processor 1206 connected to one or more memory devices 1210, such as a disk drive, memory, or other device for storing data. Memory 1210 is typically used for storing programs and data during operation of the computer system 1200. Components of the computer system 1200 can be coupled by an interconnection mechanism 1208, which may include one or more buses (e.g., between components that are integrated within a same machine) and/or a network (e.g., between components that reside on separate discrete machines). The interconnection mechanism 1208 enables communications (e.g., data, instructions) to be exchanged between system components of system 1200.

Computer system 1200 may also include one or more input/output (I/O) devices 1202 and 1204, for example, a keyboard, mouse, trackball, microphone, touch screen, a printing device, display screen, speaker, etc. For example, output device 1202 may render information for external presentation (e.g., to a user such as a system designer), and input devices may accept information from external sources, such as users (e.g., system designers) and other systems. Storage 1212, typically includes a computer readable and writeable nonvolatile recording medium in which computer executable instructions are stored that define a program to be executed by the processor or information stored on or in the medium to be processed by the program.

Figure 13:
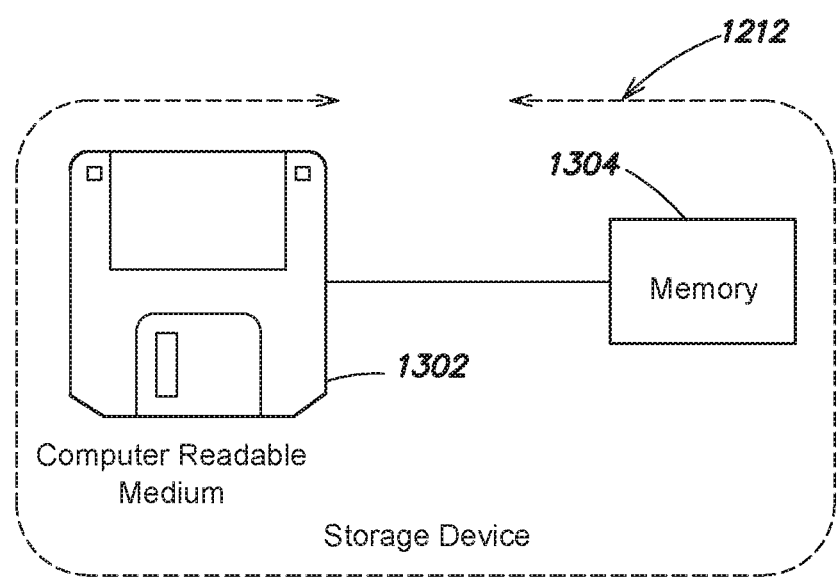
FIG. 13 is a second block diagram of an example of a distributed database system in which various aspects of the invention can be practiced.

Storage 1212 can, for example, be a disk 1302 or a flash memory as shown in FIG. 13. Typically, in operation, the processor causes data to be read from the nonvolatile recording medium into another memory 1304 that allows for faster access to the information by the processor than does the medium. This memory is typically a volatile, random access memory such as a dynamic random access memory (DRAM) or static memory (SRAM). According to one embodiment, the computer-readable medium comprises a non-transient storage medium on which computer executable instructions are retained.

Referring back to FIG. 12, the memory can be located in storage 1212 as shown, or in memory system 1210. The processor 1206 generally manipulates the data within the memory 1210, and then copies the data to the medium associated with storage 1212 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention can be implemented in software, hardware, or firmware, or any combination thereof. Although computer system 1200 is shown by way of example, as one type of computer system upon which various aspects of the invention can be practiced, it should be appreciated that aspects of the invention are not limited to being implemented on the computer system as shown in FIG. 12. Various aspects of the invention can be practiced on one or more computers having different architectures or components than that shown in FIG. 12.

It should be appreciated that the invention is not limited to executing on any particular system or group of systems. Also, it should be appreciated that the invention is not limited to any particular distributed architecture, network, or communication protocol.

Various embodiments of the invention can be programmed using an object-oriented programming language, such as Java, C++, Ada, or C# (C-Sharp). Other programming languages may also be used. Alternatively, functional, scripting, and/or logical programming languages can be used. Various aspects of the invention can be implemented in a non-programmed environment (e.g., documents created in HTML, XML or other format that, when viewed in a window of a browser program, render aspects of a graphical-user interface (GUI) or perform other functions). The system libraries of the programming languages are incorporated herein by reference. Various aspects of the invention can be implemented as programmed or non-programmed elements, or any combination thereof.

Various aspects of this invention can be implemented by one or more systems similar to computer system 1200 shown in FIG. 12. For instance, an input device 1204 may receive at least one design parameter such as a desired design wavelengths, focal lengths, lens structures, etc., and/or optical properties of optical materials, from a user or from other computer system. A memory system 1210 and/or storage 1212 may store the information received through the input device, such as the optical properties of one or more optical materials. At least one processor 1206 may be configured to identify one or more optical materials that are transmissive at the design wavelengths (such as a subset of materials stored in the memory system 1210 or storage 1212), and identify a system of equations as discussed above. The processor 1206 may also be configured to determine a merit value for each solution (e.g., by using merit functions as described above) and then rank the merit values of the multiple solutions. An output device 1202 may be used to receive and display the ranking of the merit values and the respective solution.

EXAMPLES

The system and method described herein will be more fully understood from the following example, which is illustrative in nature and is not intended to limit the scope of the disclosure.

Example 1—Method for Designing a Multi-Band Optical System

Multiple solutions were calculated for a cross-band apochromatic application using three elements similar to that shown in FIG. 7A, and the results were ranked according to their respective merit value. The design parameters for this example were as follows:
SWIR $\lambda=1.55$ microns ($\lambda_S$)
$1^{st}$ LWIR $\lambda=8$ microns ($\lambda_M$)
$2^{nd}$ LWIR $\lambda=9.5$ microns ($\lambda_L$)
The process used for this example follows that shown in FIG. 9 and the results are shown below in Table 1.

TABLE 1

Results from Example Design Scenario

| Solution | Element Materials | | | Element Fractional Powers | | | Merit, M1 |
|---|---|---|---|---|---|---|---|
| 1 | BaF$_2$ | ZnSe | CdTe | −0.2531 | 2.3349 | −1.0818 | 3.670 |
| 2 | BaF$_2$ | ClZnS | CdTe | −0.7521 | 2.4731 | −0.7210 | 3.946 |
| 3 | BaF$_2$ | ZnSe | AMTIR-2 | −0.2929 | 2.6302 | −1.3373 | 4.260 |
| 4 | BaF$_2$ | ZnSe | IRG26 | −0.2820 | 2.6452 | −1.3632 | 4.290 |
| 5 | BaF$_2$ | ClZnS | AMTIR-2 | −0.8179 | 2.6732 | −0.8553 | 4.346 |
| 6 | BaF$_2$ | ClZnS | IRG26 | −0.8129 | 2.6829 | −0.8700 | 4.366 |
| 7 | BaF$_2$ | As$_2$S$_3$ | CdTe | −0.3672 | 2.8068 | −1.4397 | 4.614 |
| 8 | BaF$_2$ | AMTIR-2 | As$_2$S$_3$ | −0.4425 | −1.8575 | 3.3000 | 5.600 |
| 9 | BaF$_2$ | IRG26 | As$_2$S$_3$ | −0.4285 | −1.8977 | 3.3262 | 5.652 |
| 10 | ZnSe | ClZnS | CdTe | 3.5190 | −1.2543 | −1.2647 | 6.038 |

Figure 14A:
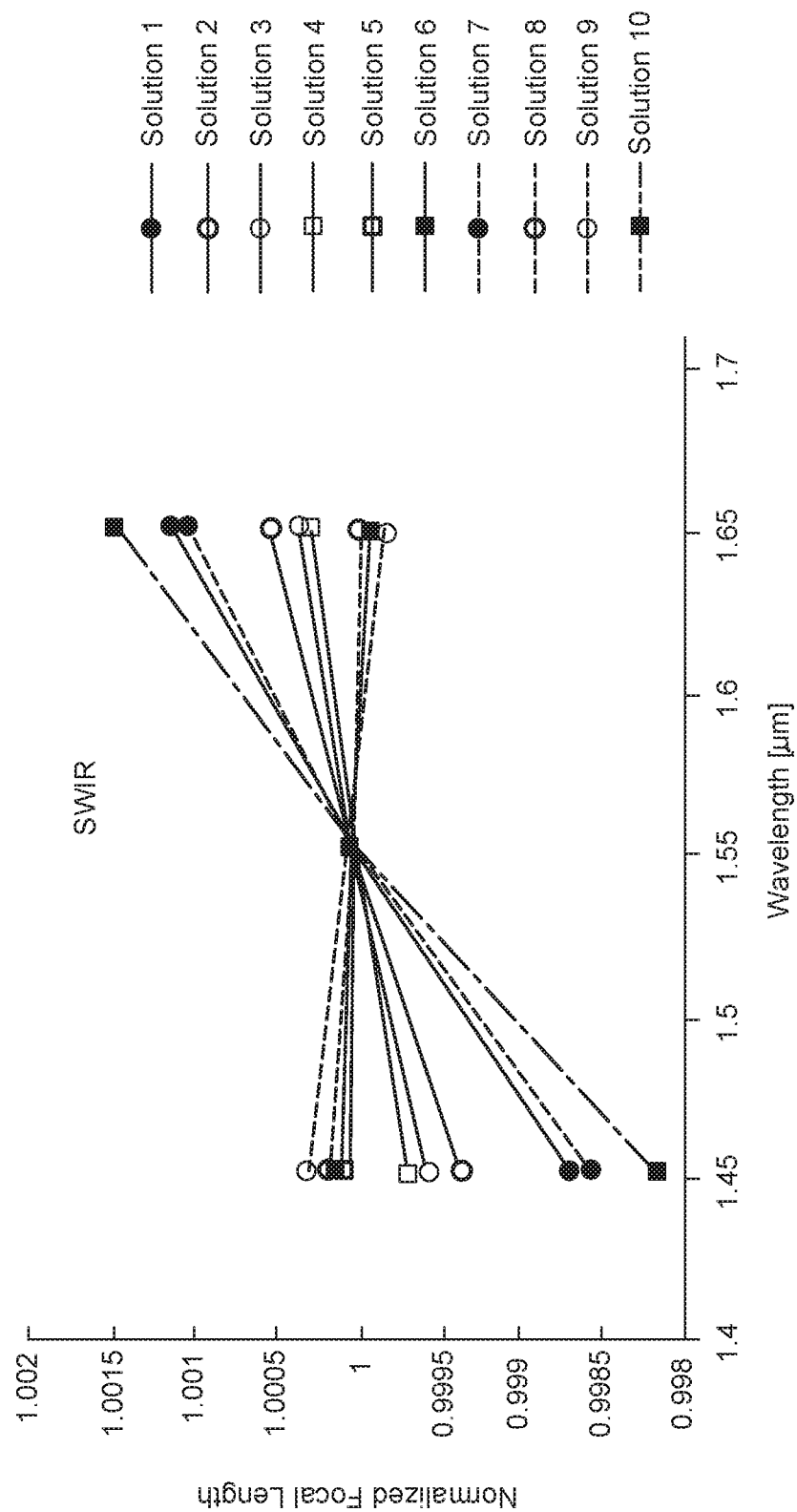
FIG. 14A is a graph that plots a first example of the normalized focal length versus SWIR wavelength in accordance with aspects of the present invention.
Figure 14B:
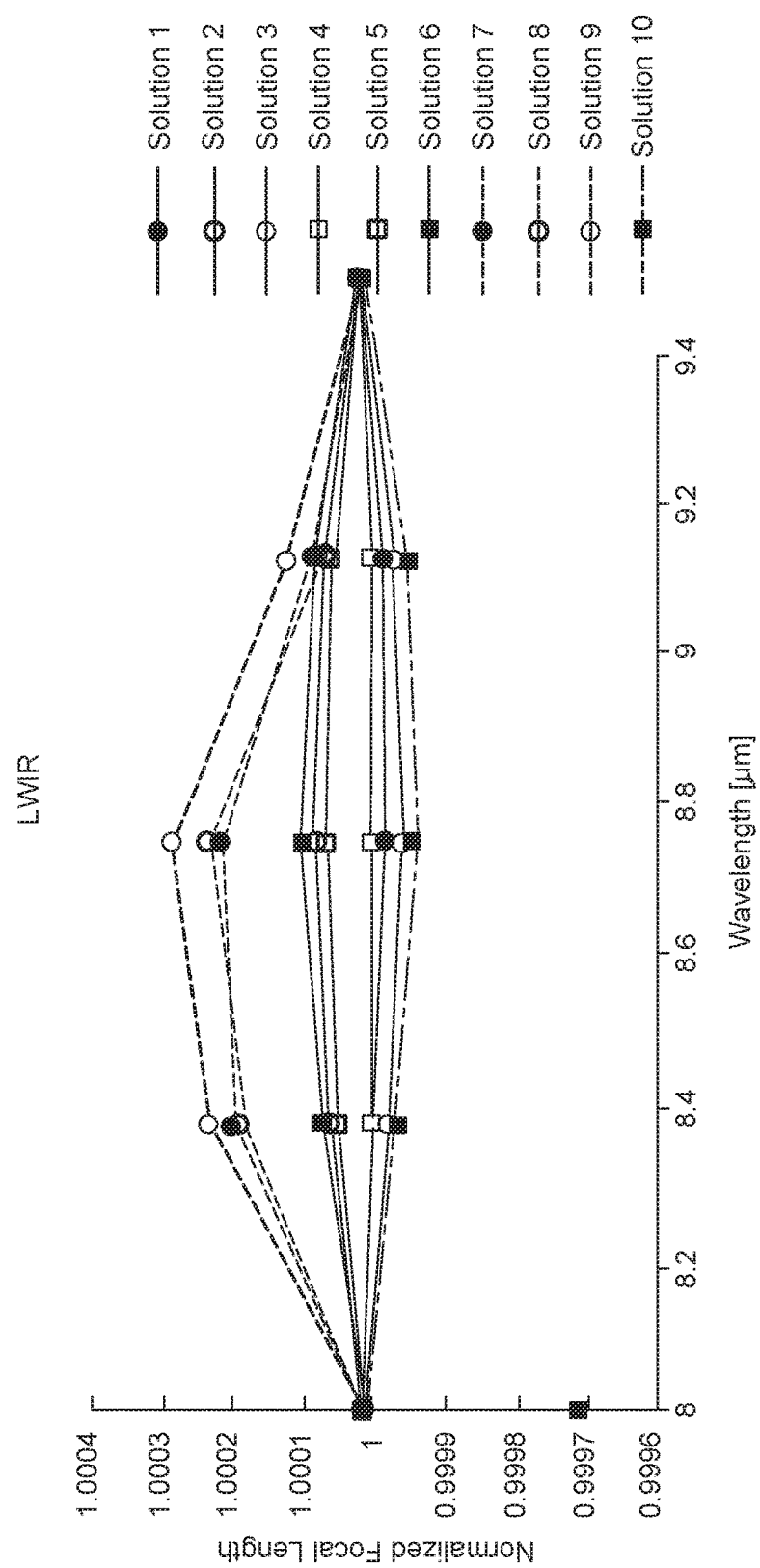
FIG. 14B is a graph that plots a first example of the normalized focal length versus LWIR wavelength in accordance with aspects of the present invention.

As discussed above, each solution may be used in the design of an optical system. For instance, the first solution may be used to form a compound lens such as that shown in FIG. 8, such that the first lens is ZnSe, the second lens is CdTe, and the third lens is BaF$_2$. Thus, according to this approach, an exact solution for three selected design wavelengths may be provided for the purposes of implementing a cross-band apochromatic system. FIGS. 14A and 14B plot the normalized focal length variation versus wavelength for each solution shown in Table 1. The graphs indicate that the focal length is equal to unity at the specified wavelengths.

Example 2—Method for Designing a Multi-Band Optical System (Generalized Analysis)

Multiple solutions were calculated for a cross-band apochromatic application using the generalized analysis discussed above in reference to FIG. 7B, and the results were ranked according to their respective merit values. The design parameters for this example were as follows:
Design Wavelengths:
SWIR: 1.45, 1.55, 1.65 microns
LWIR: 8, 8.375, 8.75, 9.125, 9.5 microns
The averaged lens power over the design wavelengths was set to unity, and the results from the generalized analysis are shown below in Table 2.

Figure 15A:
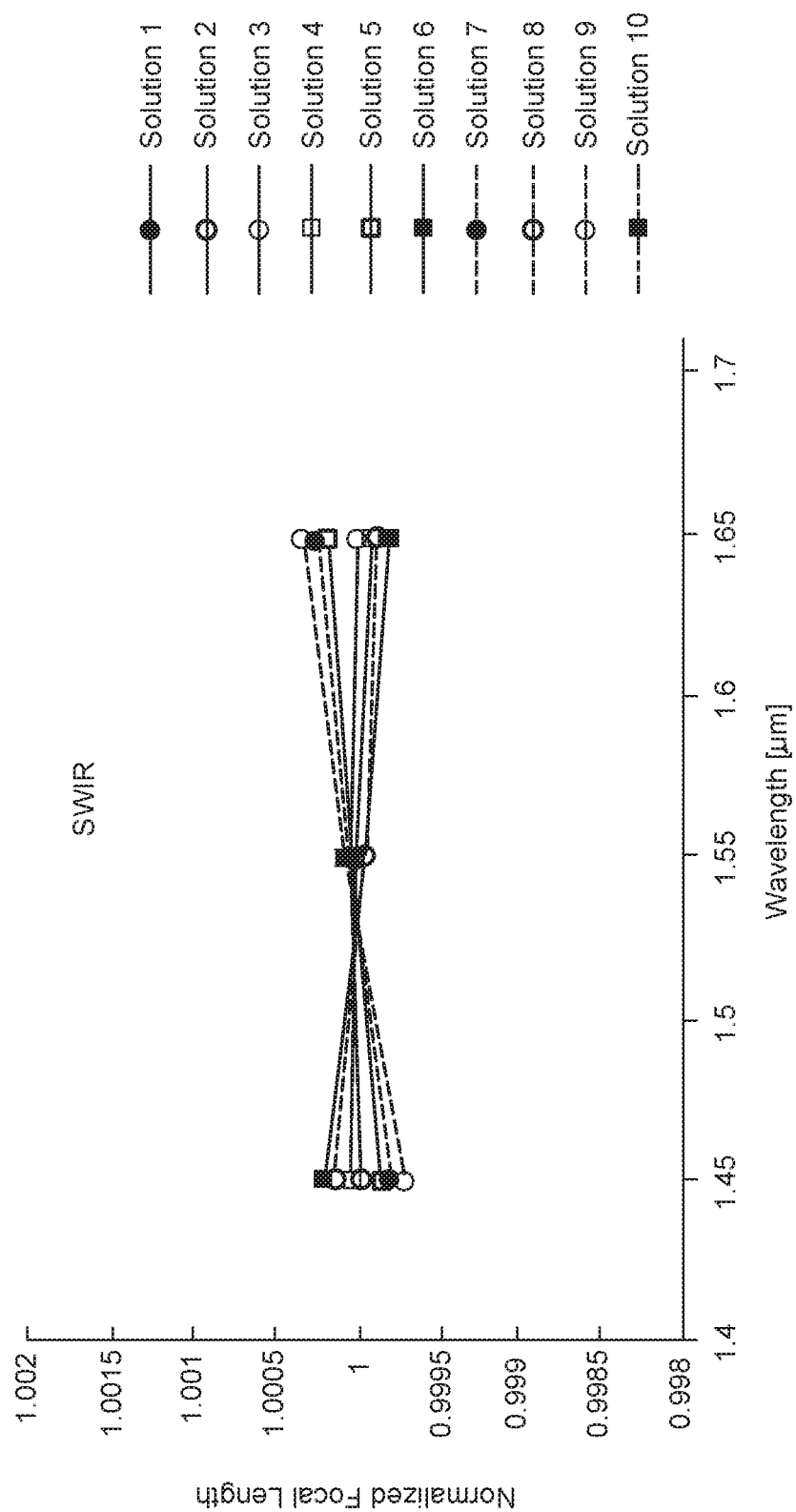
FIG. 15A is a graph that plots a second example of the normalized focal length versus SWIR wavelength in accordance with aspects of the invention.

Table 2. In this example, the value for $\bar{n}_k$ was chosen to be the index of refraction for the $k^{th}$ element's material averaged over the design wavelength. FIG. 15A shows that focal length variation over the SWIR spectral band has been significantly reduced compared to the result shown in FIG. 14A.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A method for cross-band apochromatic correction in a multi-element optical system, comprising:
    selecting a set of design wavelengths, wherein at least two design wavelengths are selected from disparate infrared (IR) bands;
    determining a set of optical materials that are transmissive at each design wavelength in the set of design wavelengths;

TABLE 2

Results from Generalized Analysis Approach

| Solution | Element Materials | | | Element Fractional Powers | | | RMS Error | Merit, M1 | Merit, M2 |
|---|---|---|---|---|---|---|---|---|---|
| 1 | BaF$_2$ | ClZnS | AMTIR-2 | −0.8370 | 2.7077 | −0.8707 | 4.405E−05 | 4.415 | 0.3160 |
| 2 | BaF$_2$ | ClZnS | As$_2$S$_3$ | −1.1677 | 5.0319 | −2.8642 | 5.257E−05 | 9.064 | 0.2468 |
| 3 | BaF$_2$ | ClZnS | IRG26 | −0.8331 | 2.7266 | −0.8936 | 8.532E−05 | 4.453 | 0.3202 |
| 4 | BaF$_2$ | AMTIR-2 | As$_2$S$_3$ | −0.4517 | −1.8837 | 3.3354 | 1.268E−04 | 5.671 | 0.3966 |
| 5 | BaF$_2$ | ZnSe | IRG26 | −0.2902 | 2.6202 | −1.3300 | 1.685E−04 | 4.240 | 0.4021 |
| 6 | BaF$_2$ | IRG26 | As$_2$S$_3$ | −0.4373 | −1.9480 | 3.3852 | 2.102E−04 | 5.770 | 0.4068 |
| 7 | BaF$_2$ | ZnSe | AMTIR-2 | −0.3017 | 2.5908 | −1.2891 | 2.268E−04 | 4.182 | 0.3950 |
| 8 | ClZnS | AMTIR-2 | As$_2$S$_3$ | −3.1742 | −3.0713 | 7.2455 | 2.309E−04 | 13.491 | 0.4910 |
| 9 | ZnSe | ClZnS | IRG26 | 4.0206 | −1.4571 | −1.5635 | 2.997E−04 | 7.041 | 0.4460 |
| 10 | BaF$_2$ | ClZnS | CdTe | −0.7582 | 2.4174 | −0.6592 | 3.090E−04 | 3.835 | 0.3085 |

The solutions shown above generated from the generalized analysis show material combinations that provide the best results over the analysis band, rather than only three wavelengths as illustrated in Example 1. Thus, the general solution presented herein may be used to minimize the focal length variation over an arbitrary set of wavelengths.

Figure 15B:
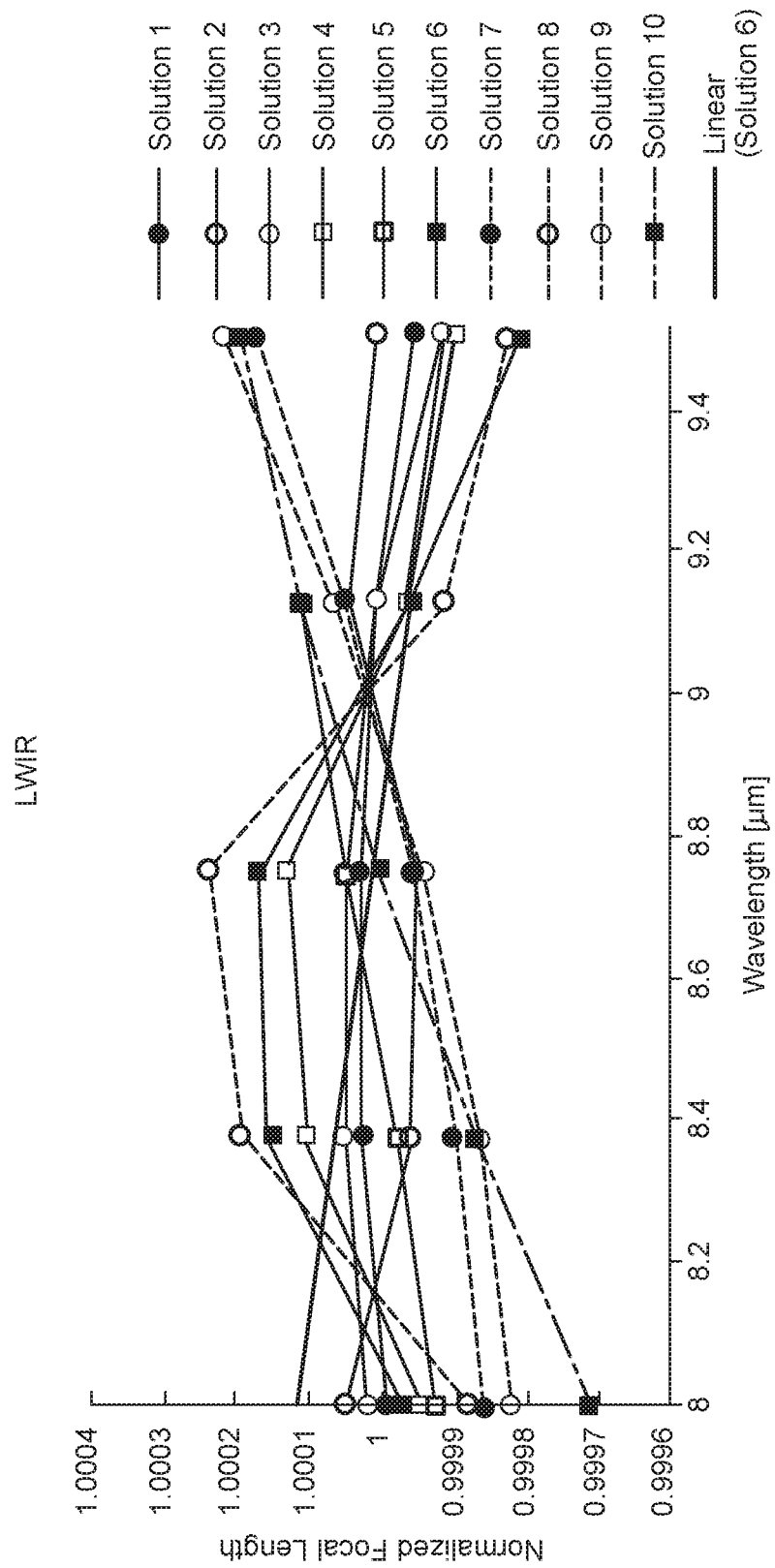
FIG. 15B is a graph that plots a second example of the normalized focal length versus LWIR wavelength in accordance with aspects of the invention.

FIGS. 15A and 15B illustrate the normalized focal length variation over the spectral bands for the solutions shown in identifying a system of linear equations that describe the multi-element optical system in terms of a normalized optical power over the set of design wavelengths;
generating multiple solutions for the system of linear equations, each solution defining a set of design optical materials selected from the set of optical materials and based at least in part on calculating mean squared difference values for wavelength pair combinations of design wavelengths in the set of design wavelengths;

determining a merit value for each solution of the multiple solutions using a merit function, the merit value based on minimizing the mean squared difference values;

ranking the merit values of the multiple solutions;

based on at least one solution of the multiple solutions, designing the multi-element optical system; and using the multi-element optical system to perform optical imaging.

2. The method of claim 1, further comprising setting a focal length of the multi-element optical system at a selected one design wavelength of the set of design wavelengths.

3. The method of claim 2, further comprising scaling each solution by the focal length.

4. The method of claim 1, further comprising determining a refractive index for each optical material of the set of optical materials at each design wavelength of the set of design wavelengths.

5. The method of claim 1, wherein the merit function is based on a square root of the mean squared difference values.

6. The method of claim 1, wherein the merit function is based on an absolute sum of a normalized optical power of each design optical material of the set of design optical materials.

7. The method of claim 6, wherein the merit function is further based on at least one optical property of each design optical material of the set of design optical materials.

8. The method of claim 1, wherein ranking comprises ordering the merit values from smallest to largest.

9. The method of claim 1, wherein at least one design wavelength is a Medium Wave InfraRed (MWIR) wavelength and at least one design wavelength is a Long Wave InfraRed (LWIR) wavelength.

10. The method of claim 1, wherein at least one design wavelength is a Short Wave InfraRed (SWIR) wavelength and at least one design wavelength is a Medium Wave InfraRed (MWIR) wavelength.

11. The method of claim 1, wherein at least one design wavelength is a Short Wave InfraRed (SWIR) wavelength and at least one design wavelength is a Long Wave InfraRed (LWIR) wavelength.

12. The method of claim 1, wherein the set of optical materials comprises: barium fluoride ($BaF_2$), zinc selenide (ZnSe), multi-spectral zinc sulfide (ZnS), AMTIR-2 (AsSe), IRG26, gallium arsenide (GaAs), arsenic trisulfide ($As_2S_3$), and cadmium telluride (CdTe).

13. The method of claim 1, further comprising sending at least one solution of the multiple solutions to a lens generating system.

14. The method of claim 11, wherein selecting a set of design wavelengths comprises selecting a first design wavelength that is a SWIR wavelength, a second design wavelength that is a first LWIR wavelength, and a third design wavelength that is a second LWIR wavelength.

15. The method of claim 14, wherein each solution includes a first lens material, a second lens material, and a third lens material selected from the set of design optical materials.

16. The method of claim 15, further comprising selecting at least one additional lens material that functions as an afocal corrector and corrects for residual aberrations in the optical system caused by at least one of the first, second, and third lens materials.

17. An optimization engine system for generating multiple solutions for cross-band apochromatic correction in a multi-element optical system, comprising:

a memory having stored therein at least one optical property associated with each of a plurality of optical materials;

an input configured to receive design parameters of the multi-element optical system, the design parameters including a set of design wavelengths, wherein at least two design wavelengths are from disparate infrared (IR) bands;

at least one processor coupled to the memory and the input and configured to:

identify from the plurality of optical materials a set of optical materials that are transmissive at each design wavelength in the set of design wavelengths;

identify a system of linear equations that describe the multi-element optical system in terms of a normalized optical power over the set of design wavelengths;

generate multiple solutions for the system of linear equations, each solution defining a set of design optical materials selected from the set of optical materials and based at least in part on calculating mean squared difference values for wavelength pair combinations of design wavelengths in the set of design wavelengths;

determine a merit value for each solution of the multiple solutions using a merit function, the merit value based on minimizing the mean squared difference values; and rank the merit values of the multiple solutions; and use a respective solution of the multiple solutions to design the multi-element optical system;

an output coupled to the at least one processor and configured to receive and display the ranked merit values and the respective solution; and the multi-element optical system configured to perform optical imaging.

18. The optimization engine system of claim 17, wherein the processor is further configured to select a solution based on the ranked merit values and the output is configured to display the selected solution.

19. The optimization engine system of claim 17, wherein the processor is further configured to set a focal length of the multi-element optical system at a selected one design wavelength of the set of design wavelengths.

20. The optimization engine system of claim 19, wherein the processor is further configured to scale each solution by the focal length.

* * * * *